(12) United States Patent
Davey et al.

(10) Patent No.: US 6,576,341 B1
(45) Date of Patent: Jun. 10, 2003

(54) COMPOSITION

(75) Inventors: Andrew Davey, Dublin (IE); Seamus Curran, Dublin (IE); Werner Blau, Dublin (IE)

(73) Assignees: Horcom Limited, Dublin 2 (IE); Materials Ireland, a division of Forbairt, Dublin 9 (IE); The Provost Fellows and Scholars of the College of the Holy and Undivided Trinity of Queen Elizabeth Near Dublin of College Green, Dublin 2 (IE)

( * ) Notice: Subject to any disclaimer, the term of this patent is extended or adjusted under 35 U.S.C. 154(b) by 0 days.

(21) Appl. No.: 09/288,671

(22) Filed: Apr. 9, 1999

(30) Foreign Application Priority Data

Apr. 9, 1998 (IE) ............................................. S980272

(51) Int. Cl.$^7$ ................................................ D02G 3/00
(52) U.S. Cl. ....................... 428/376; 423/460; 423/461; 428/461; 428/462; 428/367; 428/377; 428/378
(58) Field of Search ................................ 423/461, 460, 423/367; 428/376, 378, 377, 462, 461

(56) References Cited

U.S. PATENT DOCUMENTS

| | | | | |
|---|---|---|---|---|
| 5,281,653 A | * | 1/1994 | Thomann et al. | 524/490 |
| 5,560,898 A | | 10/1996 | Uchida et al. | 423/461 |
| 5,711,927 A | * | 1/1998 | Atwood et al. | 423/445 B |
| 5,866,434 A | * | 2/1999 | Massey et al. | 436/526 |

OTHER PUBLICATIONS

Curran S. A. et al. "Composite from Poly(m–phenylenevinylene–co–2,5–diocty–p–phenylenevinylene) and carbon nanotubes; A Novel Material for Optoelectronics" Advanced Materials, Oct. 1, 1008, Wiley–VCH Verlag Berlin, Ger.vol. 10, No. 14 pp. 1091–1093, Oct. 1998.*

Coleman J. N. et al. "Precolation–Dominated Conductivity in Conjugated Polymer–Carbon Nanotube Composite" Physica Review B (Condensed Matter) APS, USA vol. 58, No. 12 pp. R7492–R7495, Sep. 1998.*

Bonard J. M. et al. "Purification and Size Selection of Carbon Nanotubes" Advanced Materials vol. 9, No. 10, pp. 827–831, Aug. 1997.*

Lidzey D. G. et al. "Electroluminescence From a Soluble Poly(p–phenylenevinylene) Derivative Generated Using Scanning Tunneling Microscope" Applied Physics Letters, vol. 71, No. 14, pp. 2008–2010, Oct. 1997.*

Subramoney S. et a. "Mechanical deformation of multi–walled carbon nanotubes" Proc.—Electrochem. Soc. Recent Advances in the Chemistry and Physics of Fullerenes and Related Materials, vol. 3, pp. 728–739, Oct. 1996.*

* cited by examiner

Primary Examiner—Edward J. Cain
(74) Attorney, Agent, or Firm—Jacobson Holman PLLC (57) ABSTRACT

This invention relates to a process for purification of nanotube soot in a non-destructive and efficient method using a polymer having a coiling structure to extract nanotubes from their accompanying material without damage to their structure and with a high mass yield. Nanotube soot is added to a solvent which including a coiling polymer to form a solution. The solution is mixed with a nanotube composite suspension is formed with extraneous solid material such as amorphous carbon settling at the bottom of the solution. The nanotube composite suspension is decanted from the settled solid.

15 Claims, 9 Drawing Sheets

COMPOSITION

BACKGROUND OF THE INVENTION

Carbon nanotubes are a relatively new class of materials which, in their pure form are of great technological interest as mechanical reinforcing, electrically and thermally conducting additives for static protection. The present invention relates to a method of purification of the carbon nanotubes by a non-destructive and efficient method using a new type of polymer to extract them from the accompanying material without damage to their structure.

When friction and separation occurs between materials, a transfer of electrons from the atoms on the surface will take place. This process is referred to as triboelectric generation. The resulting imbalance of electrons is what is called an electrostatic charge. This electrostatic surface charge is either positive or negative depending on whether there is a deficiency or abundance of free electrons respectively. We refer to this charge state as static electricity because it tends to remain at rest or static unless acted upon by an outside force. The amount of charge generated through the process of friction and separation will be influenced by the extent of the contact, the materials involved, relative humidity, and the texture of the material. Static charges of up to 30,000 Volts (V) are not uncommon and can be generated by the simple act of walking across a floor; yet a discharge of only 10 V can destroy a class 1 electrostatic discharge (ESD) sensitive device. Static electricity is an essence invisible although we often see it effects and can feel and measure its presence or electrostatic field. Since it is created from an imbalance of electrons it is not in a natural or stable state. Material with an imbalance of electrons will, when possible, return to a balanced state. When this is done rapidly a zap or spark associated with rapid ESD occurs. We may feel the zap if the discharge that occurs is over 3000 V. Electrostatic discharges below that level are below the threshold of human sensation but are still lethal to electronic and associated semi-conductor devices.

One common misconception is that conductive materials do not generate charges. This is because the dissipation of static charges from grounded conductive material tends to be complete and rapid. Ungrounded conductors can generate and hold static charges.

The material the inhibits the generation of static charges from triboelectric generation is classified as antistatic. An antistatic material can be conductive, dissipative or even insulative. Only conductive or dissipative antistatic material should be used in ESD safe areas. Insulative material are more commonly understood to generate and hold a static charge. Since they are insulators they do not allow the charge to move or distribute throughout the object. Grounding is not an effective method of neutralising insulators. Static fields on insulators are not necessarily permanent either; they will eventually be neutralised by gradual recombination with free ions. Free ions are charged particles that occur naturally in air. They may be in the form of atoms, molecules, or group of molecules such as water droplets. As free ions pass near a charged object of the opposite polarity they are attached by the field and will gradually return the material to a state of balance. A charged object is surrounded by an electrostatic field. This field can also effect nearby objects by charge induction. Charge induction lets an electrostatically charged object charge other nearby objects without actually touching them; typically as far away as several feet.

In the processing of film materials of plastics, static material can cause materials to cling to each other causing product quality problems or production slow-down. In clean rooms, charged materials can hold static-laden dust, preventing these dust particles from being circulated and picked up by the filtration system. Microelectronics suffers a different type of quality problem due to static electricity. Electronic components are composed of micro miniature traces and structures of alternating layers that may be insulative, conductive or semi-conductive. Rapid ESD can cause damage to these underlying structures via the traces of the component. Unfortunately, ESD damage to electronic components is not as readily apparent as the effects of static electricity in other industries. This is because ESD damage is not generally visible as it occurs and may be latent or not show up in functional testing of electronic devices. ESD damage may lead to premature or intermittent failure. Estimates of the cost of ESD damage to electronic based equipment run as high as five billion dollars annually. The cost of ESD damage is not simply the cost of the components, but includes the cost of labour and may include all of the expenses associated with field repair. Another cost is that of lost business due to customer dissatisfaction.

Current methods used to combat static electricity include charge prevention, shielding and neutralisation. Charge prevention is accomplished by reducing the exposure to charge generating materials. Charge generation can be prevented through the elimination of unnecessary activities that create static charges, the removal of unnecessary materials that are known charge generators and the use of antistatic materials.

Antistatic materials are those materials that are shown to create minimal static charges generally less than 200 V, when exposed to friction and separation. Antistatic materials may be naturally low in charge generation properties or have been made or treated with an antistatic agent.

Carbon nanotubes are graphite sheets that are rolled up and closed at either end producing a closed tube of carbon atoms. Carbon nanotubes have an electronic character that ranges from semi-conducting to metallic. It is these unique electronic characteristics that confers on the carbon nanotubes their potential for use as antistatic agents.

Carbon nanotube production can be carried out using the Krätschmer generator where sublimation and recombination occur to form carbon nanotube soot from graphite rods in a plasma. To date, there have been problems purifying the carbon nanotubes from the soot. Methods that have previously been disclosed for purifying carbon nanotubes include purification by treatment with strong chemical oxidants, purification by burning of unpurified samples and purification using surfactants. One such method is described in No. U.S. Pat. No. 5,560,898. All of the previously disclosed methods have disadvantages. Chemical oxidants do remove the nanotubes from the impure soot but tend to break chemical bonds in the nanotubes, especially at the tips. Methods involving burning tend to produce better purity samples but the yields are very poor in the order of 1% to 2% yield of carbon nanotubes. Purification using surfactants is more efficient but still involves high power ultrasonic bath treatment which is again known to break nanotubes at their tips.

It is an object of the present invention to overcome these problems.

It is also an object of the invention to provide a method for purifying carbon nanotubes that is not destructive and is efficient and easy to reproduce.

SUMMARY OF THE INVENTION

According to the present invention there is provided a composition which includes nanotubes and an organic material. Preferably the organic material has a coiling structure. The term "coiling structure" as used in this specification means a structure which facilitates the organic material wrapping about the nanotubes, that is capable of forming structures which wrap, coil, curve or bend around the nanotubes. The material may form strands and/or ropes for this purpose.

The term nanotube as used in this patent specification is taken to mean any nanostructure and related materials. The organic material may comprise one or more polymer (conjugated and non-conjugated), oligomer (conjugated and non-conjugated) and monomer (conjugated and non-conjugated) or combinations thereof. The nanotubes which are mixed with these can be in the form of carbon nanotubes, nanotubes of other materials such as vanadium pentoxide for example, nanostructures (regular and undefined), as well as derivatives of these which can be based on or contain, as an example, Silicon, Boron, Tin, nitrogen, compounds of vanadium and oxygen such as vanadium pentoxide, etc. The nanostructures can have dimensions from nanometers in length to millimeters in length, as well as nanometers in width to micrometers in width.

In a preferred embodiment of the invention the organic material is a polymer.

In a particularly preferred embodiment the polymer is poly(m-phenylene-co-2,5-dioctoxy-p-phenylenevinylene).

Various other coiling polymers, oligomers and aggregates can be used such as poly(dioctyl fluorene) or poly(sulphonic acid). Other polymers such as polyacetylene which can form strands and/or ropes could also be used. Further, DNA and all related coiling biological systems could be used.

According to another aspect of the invention, there is provided a process for purifying nanotube soot comprising the steps of:

adding nanotube soot to a solvent which includes a nanotube extracting material to form a solution;

mixing the solution to form a nanotube composite suspension and separate solid material;

allowing the separate solid material to settle;

removing the nanotube composite suspension.

The nanotube extracting material keeps the nanotubes in suspension while allowing the undesirable solid materials such as amorphous carbon to settle out. Preferably the nanotube extracting material is an organic material. Ideally the organic material has a coiling structure.

In a preferred embodiment the nanotube extracting material is one or more polymer, oligomer or monomer or combinations thereof.

In a preferred embodiment the nanotube extracting material is poly(m-phenylene-co-2,5-dioctoxy-p-phenylenevinylene).

Preferably the nanotube soot, nanotube extracting material and solvent are mixed in an optimized ratio dependent on the starting materials used. The solvent could be a liquid or gel. Any suitable solvent which can solubilise the nanotube extracting material can be used.

In another embodiment of the invention the solvent used is an organic solvent.

In another embodiment of the invention the organic solvent is an arene aromatic hydrocarbon.

Conveniently, the solution is mixed by sonication. However, any other suitable mixing method may be used.

In a preferred embodiment of the invention the solution is mixed in a low power ultrasonic bath for at least 20 minutes.

According to another aspect of the invention there is provided a process for making a nanotube and organic polymer suspension comprising the steps of mixing a solvent with an organic polymer to form a solution having a desired viscosity, said viscosity being sufficient to suspend nanotube containing material to the solution, and mixing the nanotube containing material through the solution to form a nanotube and organic polymer suspension.

In another aspect the invention provides a nanotube extracting polymer poly(m-phenylene-co-2,5-dioctoxy-p-phenylenevinylene, of the formula:

The side groups can be changed if desired to change the helical structure. In some cases only one side group may be provided.

In a still further aspect the invention provides a method for preparing poly(m-phenylene-co-2,5-dioctoxy-p-phenylenevinylene)polymer comprising:

adding a phosphonate salt and an aldehyde to an ionizing solvent;

heating the mixture;

adding a potassium salt to the mixture;

allowing the mixture to react for a preset time period to form a polymer;

pouring the mixture into a solvent to enable the polymer to precipitate;

separating the polymer from the liquid;

drying the polymer; and purifying the polymer.

In one embodiment of the invention the phosphonate salt, aldehyde and ionizing solvent are mixed in an optimised concentration ratio.

In one embodiment of the invention the phosphonate salt used is 1,4-bis(2,5-dioctoxy)benzyldiethyl-phosphonate.

In another embodiment of the invention the aldehyde used is terphthalaldehyde.

In another embodiment of the invention the ionising solvent is a formamide.

In one embodiment of the invention the polymer is prepared in an inert atmosphere.

In a preferred embodiment of the invention the inert atmosphere is an argon atmosphere.

In another embodiment of the invention the mixture is heated to between 70 and 90° C.

In a preferred embodiment of the invention the mixture is heated to about 80° C.

In another embodiment of the invention the potassium salt is potassium tert-butoxide.

In another embodiment of the invention the mixture is allowed to react for at least 3 hours.

In another embodiment of the invention the solvent used is water.

In another embodiment of the invention the polymer is separated from the liquid by centrifugation.

In another embodiment of the invention the polymer is dried under vacuum.

In another embodiment of the invention the polymer is purified by continuous extraction using an alcohol.

In another embodiment of the invention the polymer is purified by continuous extraction using a primary alcohol.

In another embodiment of the invention the alcohol is selected from the group including methanol, ethanol, propan-1-ol and phenylmethanol.

BRIEF DESCRIPTION OF THE DRAWINGS

The invention will be more clearly understood from the following description of some embodiments thereof, given by way of example only, with reference to the accompanying examples and drawings, in which:

FIG. 2b is a schematic illustration of the polymer coiling about the nanotube corresponding to the image shown in FIG. 2a;

DESCRIPTION OF PREFERRED EMBODIMENTS

Preparation of Nanotubes

Carbon nanotubes are prepared according to the Krätschmer technique in a steel generator, where sublimation and recombination occur to form nanotubes from graphite rods in a plasma. An 8 mm graphite rod is used as the positive electrode and a plug of graphite is used as the negative electrode. The generator is flushed with Helium three time before evacuating to 450 Torr. A DC potential of 27 V is applied between the two graphite rods of 99.99% purity. After the positive electrode is consumed, a grey/black cylinder is found on the negative electrode. This cylinder consists of a grey metallic outer layer and a black inner core. Analysis of the outer region has shown that it is rich in polyhedra with small amounts of nanotubes and amorphous carbon. The inner black region is very rich in nanotubes of all sizes and thickness with some deposits of amorphous carbon and polyhedra. The above conditions can alter from generator to generator, while yields of nanotubes have also varied considerably.

A number of other methods are available to produce carbon nanotubes such as for example: electric arc discharge; laser ablation; solar energy; catalytic decomposition of hydrocarbons; production of aligned nanotube bundles; carbon nanotubes grown in situ by a catalytic method and fabrication of nanotubes by plasma torch disassociation. The methods of production generally fall into two categories, those that rely on sublimation of carbon vapour, or those that use purely chemical methods. The sublimation methods are more common due to the greater quantities produced.

EXAMPLE 1

Preparation of a Nanotube Extracting Polymer poly (m-phenylene-co-2,5-dioctoxy-p-phenylenevinylene)

21.2 g (30 mmol) of 1,4-bis(2,5-dioctoxy) benzyldiethylphosphonate and 4.4 g (30 mmol) of terphthalaldehyde were added to 250 $cm^3$ of dry dimethylformamide solvent under an inert argon atmosphere. The mixture was heated to 80° C. and 11.3 g of potassium tert-butoxide was added in one portion. The mixture was allowed to react for 5 hours. Following reaction, the mixture was poured into water and the solid yellow polymer precipitated. The polymer was separated from the liquid by centrifuge (4000 r.p.m for 6 minutes; 50 $cm^3$ tube volumes) and dried under vacuum. The polymer was then purified by continuous extraction using methanol. The purity was verified by standard methods including $^1H$ and $^{13}C$ NMR and IR spectroscopy. The final yield was 10.2 g (72%).

EXAMPLE 2

Purification of Nanotube Soot

To purify the nanotube soot according to the invention 5 mg of nanotube soot prepared in a Krätschmer generator was added to 5 $cm^3$ of a 20 g $dm^{-3}$ toluene solution of the nanotube extracting polymer. The suspension was sonicated for 30 minutes in a 60 W low power ultrasonic bath then allowed to settle. Solid material such as polyhedra and amorphous carbon settle to the bottom of the container. The suspension was decanted from the settled solid and the material obtained analysed by transmission electron microscopy. Repeated trials have found that the mass yield is typically 20% from this procedure. Up to about 100 mg of nanotube soot can be added to 5 $cm^3$ of 20 g $dm^{-3}$ toluene solution of the polymer.

Figure 1:
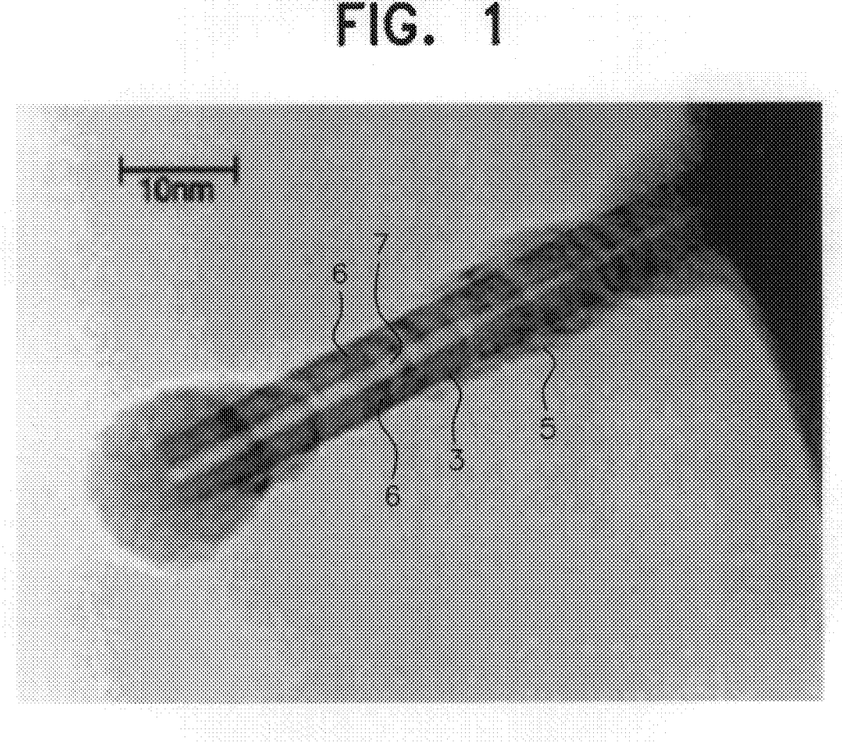
FIG. 1 is a high resolution transmission electron microscopy (TEM) image of a nanotube with a polymer shown coiling about the nanotube in accordance with the method of the invention.
Figure 2A:
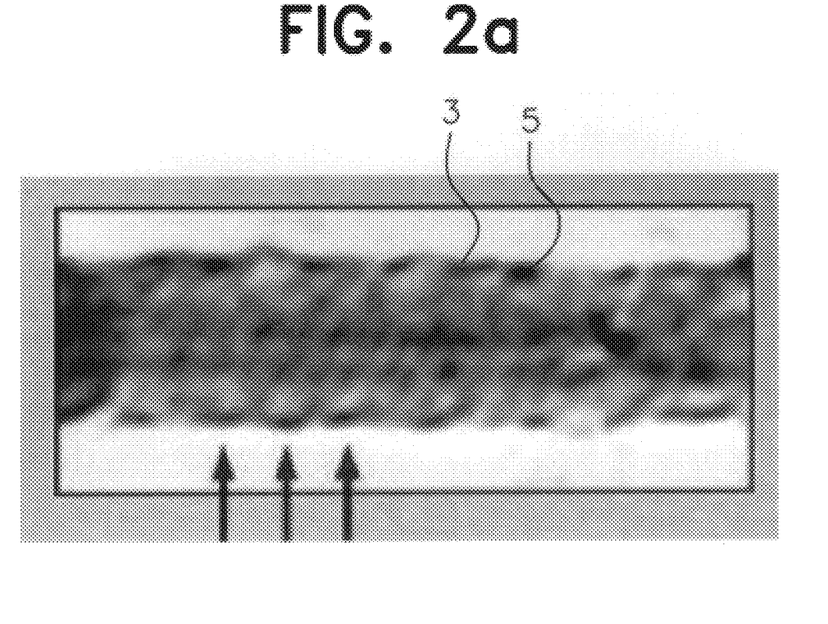
FIG. 2a is a TEM image further illustrating the coiling of the polymer about the nanotube.
Figure 2B:
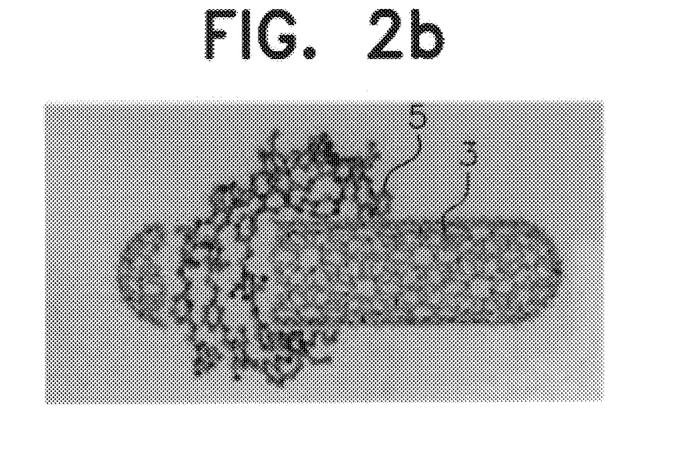
Figure 3:
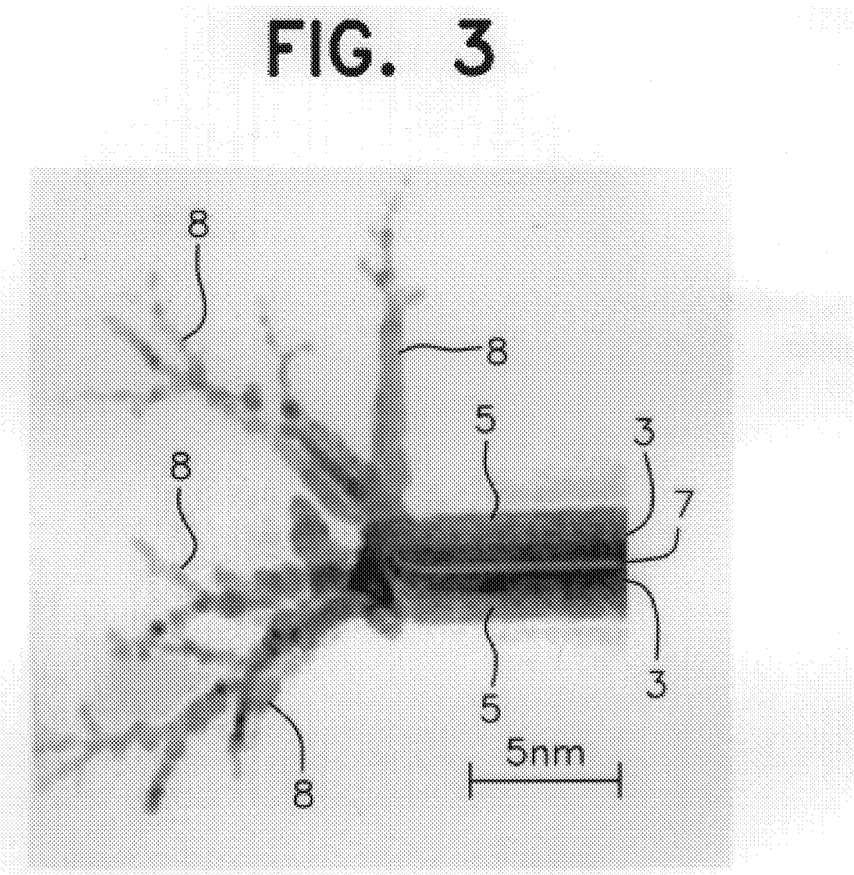
FIG. 3 is a TEM image showing an intermediate stage of the interaction between the polymer and the nanotube, with branching of the polymer.
Figure 4:
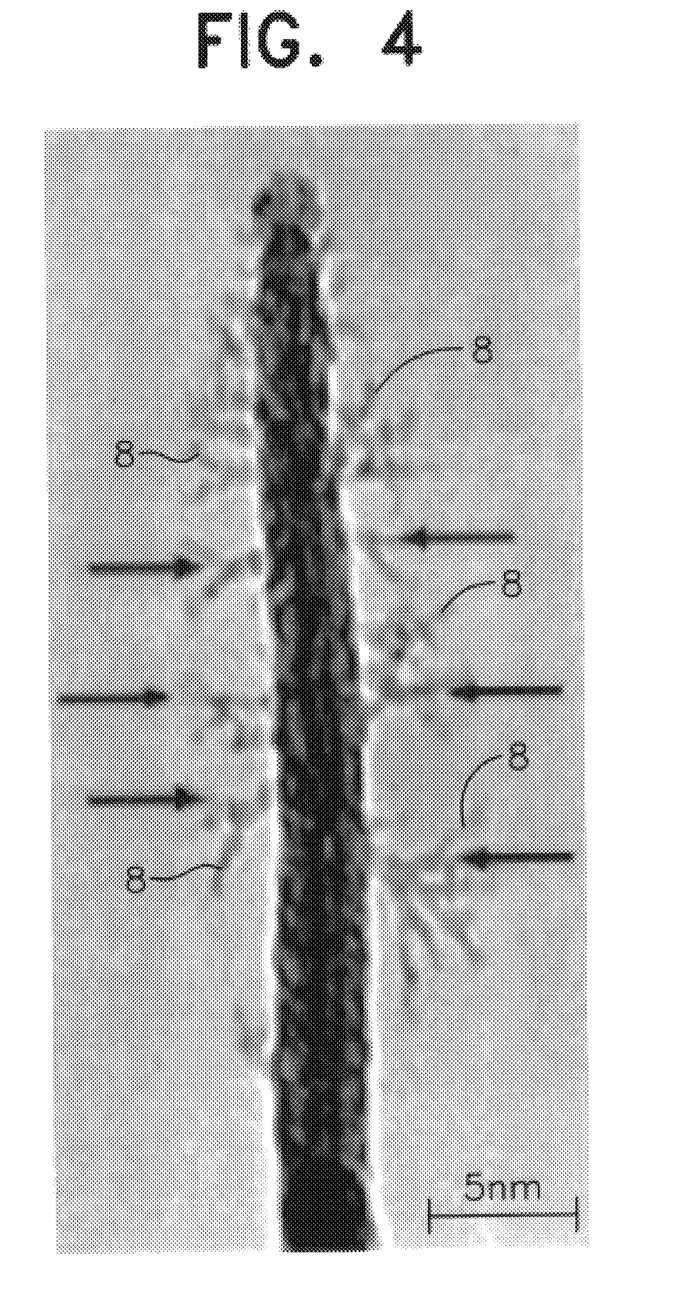
FIG. 4 is another TEM image further illustrating the branching of the polymer outwardly from the nanotube.
Figure 5:
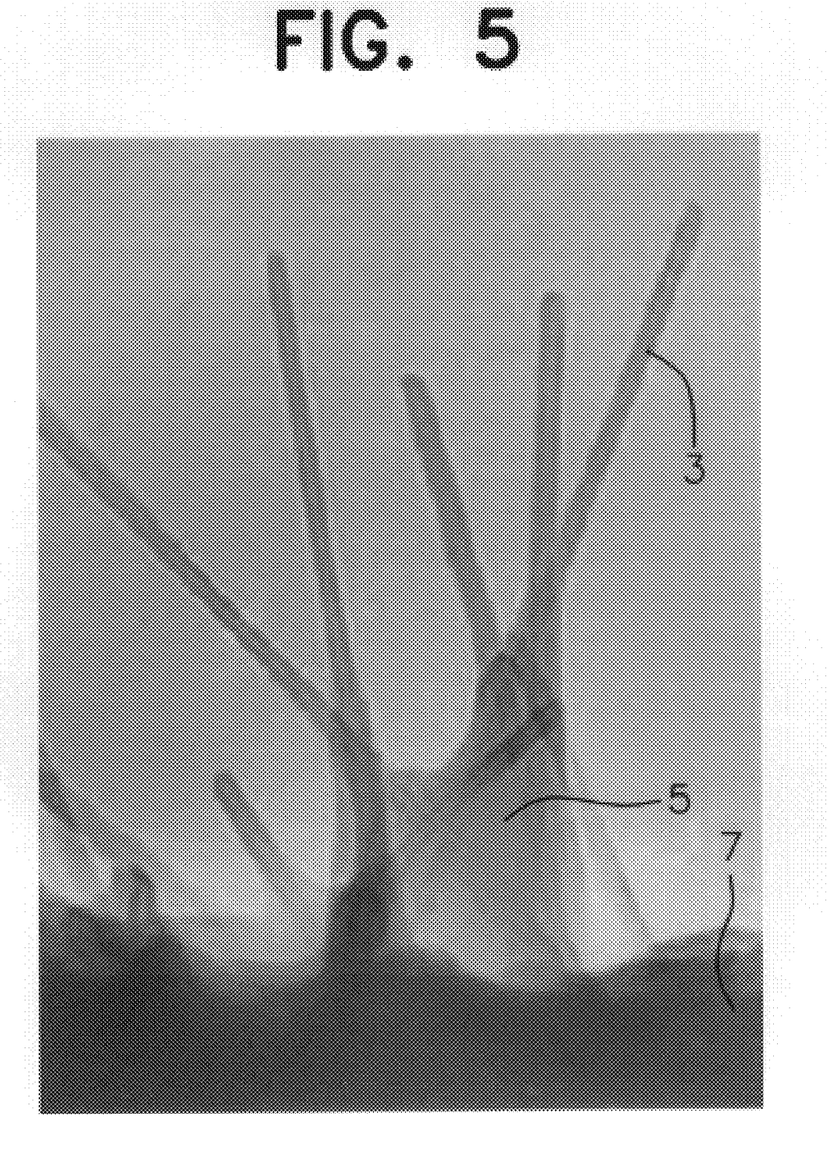
FIG. 5 is a TEM image of a nanotube polymer composite formed by the method of the invention.

FIG. 5 is a photograph of the extracted nanotube polymer composite 7 with carbon nanotubes 3 and polymer 5 also indicated.

FIGS. 1 to 5 show the interaction of the polymer with the nanotubes. A nanotube 3 is shown having a generally cylindrical wall 6 with an internal cavity 7. The polymer 5 initially wraps or coils about the nanotube 3 (see FIGS. 1 and 2). Then branches 8 of polymer extend outwardly from the nanotube 3 (see FIGS. 3 and 4). Branches 8 of polymer on adjacent nanotubes 3 then interengage to form a web which strongly binds the nanotubes together. This web can be seen indicated at 5 on FIG. 5.

EXAMPLE 3

Enhancement of Electrical Conductivity and Light Emitting Diode

Figure 6:
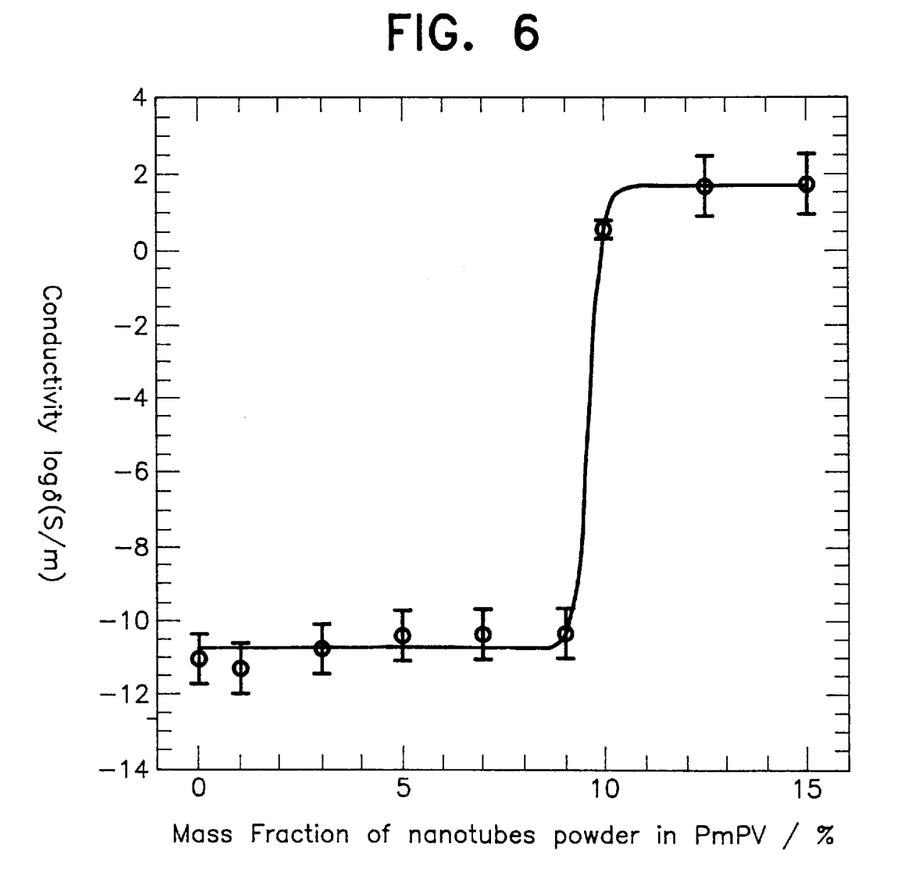
FIG. 6 is a graphical representation of the dependence of electrical conductivity on nanotube mass fraction.

Toluene solutions of the polymer ($10^{-3}$ moles $liter^{-1}$) were mixed with various weight percentages of nanotube sample and films were drop cast across platinum contacts for standard two point probe electrical conductivity measurements. FIG. 6 shows the dependence of conductivity on nanotube mass friction. Clearly, the presence of nanotubes enhances the electrical conductivity of what is an intrinsically poor conductor. The nanotubes are therefore a useful additive for forming anti-static sheets and films as well as for producing organic semiconductor devices with enhanced charge carrier mobility.

Figure 10:
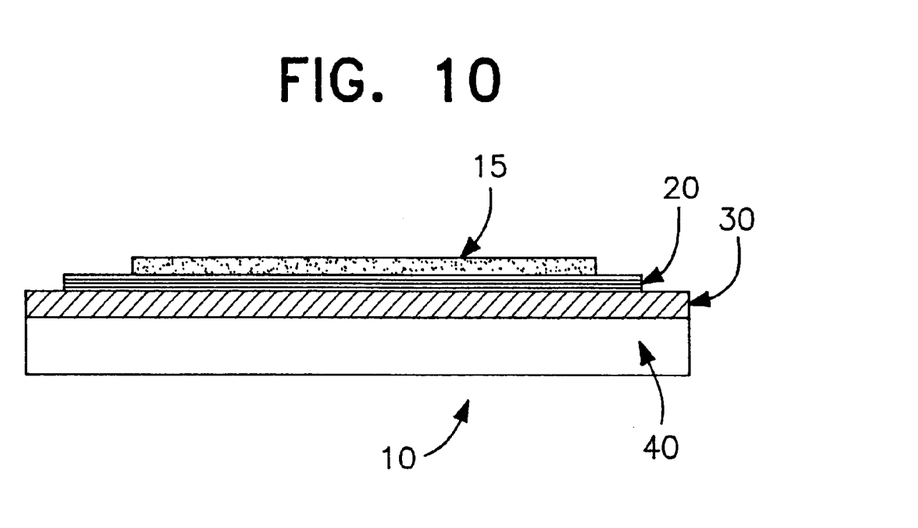
FIG. 10 schematically shows a Light Emitting Diode according to the invention.
Figure 11:
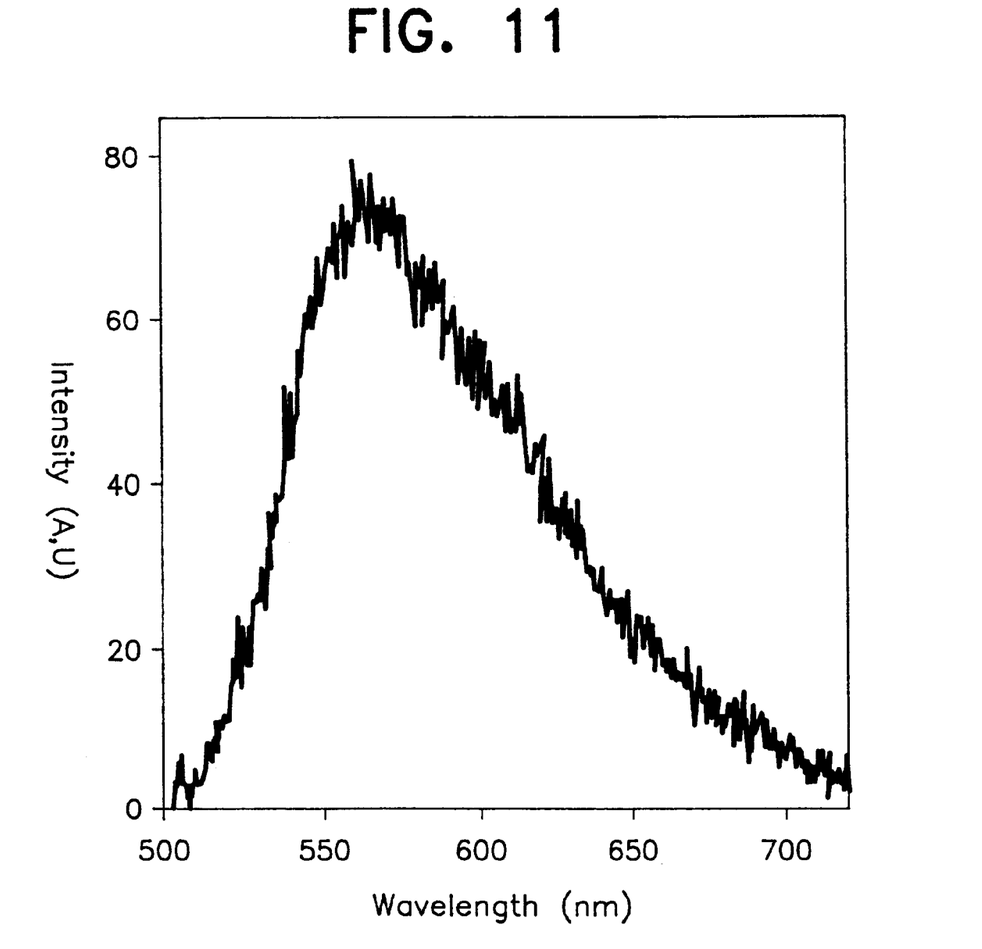
FIG. 11 is a graphical representation of the spectrum of light emitted from the Light Emitting Diode of FIG. 10.

We have exploited this useful effect by fabricating a light emitting diode 10 (FIG. 10) in which the active layer comprises a 0.1 mass fraction of nanotube composite 20. The diode 10 consists of a 1 µm thick layer of nanotube polymer composite 20 on top of an indium tin oxide contact 30 on a glass substrate 40. The top contact 15 is an evaporated aluminium layer forming an aluminium electrode. The diode 10 exhibits a current of 0.1 A for a switch on bias of 14 V. The spectrum of light emitted is shown in FIG. 11.

The diode represents a prototype semiconductor device where the charge carrier mobility and electrical conductivity are enhanced by the presence of nanotubes. The same device performance using the pure polymer requires a film thickness of less than 0.1 µm which leads to severe fabrication problems and much poorer device efficiency.

Figure 7:
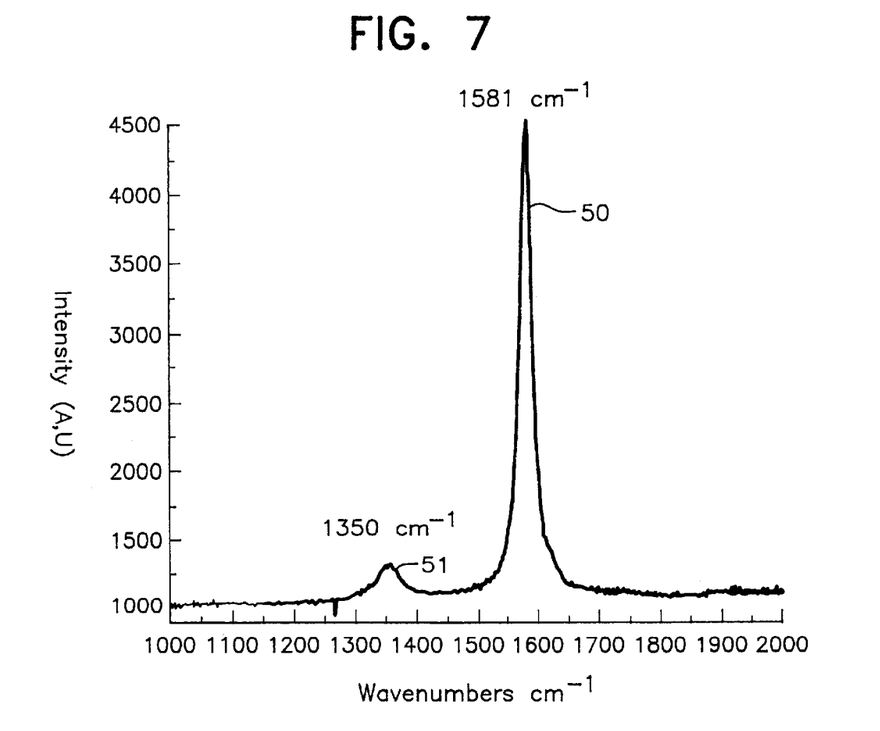
FIG. 7 is a Raman spectrum of untreated nanotube soot.
Figure 8:
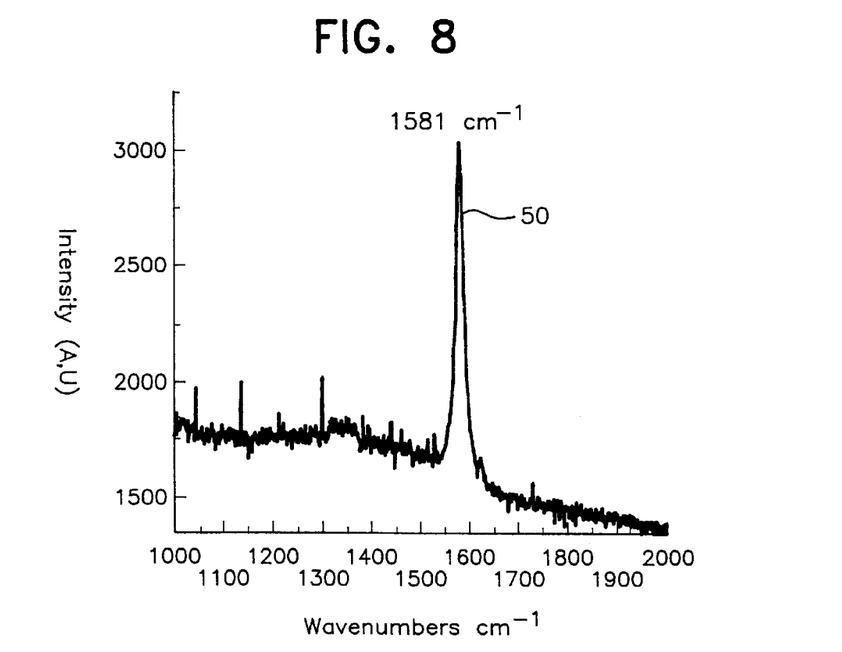
FIG. 8 is a Raman spectrum of the nanotube polymer composite formed by the method of the invention.

FIGS. 7 and 8 show Raman spectrum of unpurified nanotube soot (FIG. 7) and the purified nanotube polymer composite (FIG. 8). In FIG. 7 there is a nanotube peak 50 and an amorphous material peak 51. As can be seen in FIG. 8 the amorphous material peak has disappeared in the spectrum of the purified composite.

Figure 9:
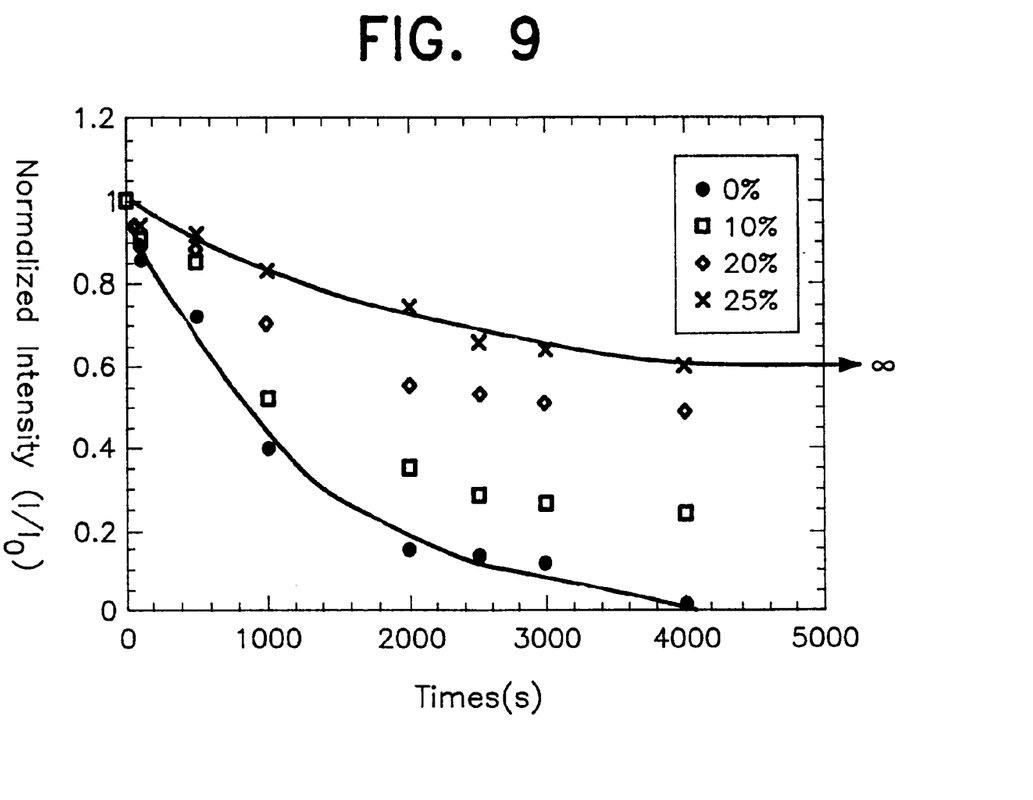
FIG. 9 is a graph illustrating the reduced degradation of plastic material incorporating nanotubes.

FIG. 9 is a graph showing reduced degradation of plastic with the incorporation of the nanotube polymer composite. Several graph lines are shown illustrating 0%, 10%, 20% and 25% mass fraction of nanotube content in the polymer.

It will be appreciated that the presence of nanotubes in conjunction with the polymer has many benefits. We have observed that the polymer and nanotube bind well together. This gives mechanical reinforcement to the polymer. The introduction of thermally conductive nanotubes should dramatically reduce the polymers susceptibility to thermal degradation. Thermal degradation is one of the major reasons for the limited lifetime of luminescent polymers. Other notable benefits are a huge increase in conductivity of the order of $10^6$ due to the introduction of nanotubes. The introduction of nanotubes also reduces aggregation affects and helps to suppress inter-chain non-radiative decay.

The present invention provides a nanotube polymer composite with technological applications comprising antistatic coatings and packaging as well as semi-conductor devices including light emitting diodes. The nanotube polymer composite has electrical conductivity of up to $10^{-3}$ $Sm^{-1}$ and has application for use in static protection. The nanotube polymer composite also has application for use in superconductivity; mechanical reinforcement: domestic, automotive and aerospace; optoelectronic technologies, telecommunications, signal processing (large non-linear optical effects). According to the present invention the carbon nanotubes can be purified in a non-destructive method. Good yields of material (in the order of 20%) are provided compared to other methods. The method of the present invention is highly reproducible from batch to batch. The present invention avoids the use of hazardous explosive or corrosive materials. The method provides a useful polymer nanotube composite material with relatively high electrical conduction which can be blended with other plastics or used as is.

Nanotubes can be used for static protection in a matrix with polymers and oligomers, conjugated and non-conjugated which can also be used in:
Fibre brushes or static dissipaters laser and matrix printer
  packaging, paper, foils, glasses, plastics, converting, printing, carpets, aircraft engines, appliances, broadcasting, industrial (lighting products, electrical control and distribution products), and electric motors materials (high-performance engineered plastics, resins, silicones, and laminates), power systems, technical products and services (medical systems and data interchange services) fan blade combuster, nozzle materials, and containment for the High speed Civil Transpor, autoclaves, compression moulding and resin transfer moulding equipment, firing furnaces, and hot isostatic presses automotive, industrial chopped fibre reinforcements for injection moulding, and blended and alloyed polymers for use as matrices in fibre reinforced composites. Aircraft are being developed with carbon reinforced plastic wings and fuselage, and very soon a rust proof reinforced plastic car will become an economic reality, protection of various equipment that generally move using non-conductive materials in their process which can cause equipment malfunctions, or even sever damage to the many device, mechanical and electronic. The nanotubes can induce an increase in conductivity to provide this protection. Mixed into heat resistant and flame retardant resins used to make plastic part and alloyed with lead in solder. Electrical wiring, motor windings, radiators, bushings, instruments, and electronic parts. Drawn into electrical wire, alloyed with tin and zinc to make brass castings. Glass, dashboard, body panels. Compounded with other minerals, resins, and pigments to make composite body panels and added to glass melt to make windows. Paint, composite body panels, spark plugs, sensors, radio, computer, and windows. Compounded with other minerals, resins, and pigments to make body panels and paints. Fused with other minerals including clays to make ceramic parts, and a component in manufacturing glass, electronic components and special wiring connectors for "air bags". Used pure and plated onto the surface of other metals, paint, tires, plastics, and ceramics. Compounded with other minerals, resins, and pigments to make interior door panels, upholstery, dashboards, and composite body panels. Combined with natural and synthetic rubber to make tires and coolant, vacuum, and fuel hoses, "Metallic" paints, interior trim, dash board, steering wheel, tires, sound proofing, weather stripping, and other plastics and rubber parts. Compounded with other minerals, resins and pigments to make paints, interior door panels, trim parts, dash boards, and composite body panels. Combined with natural and synthetic rubber to make tires and coolant, vacuum, and fuel hoses. Included in all non-metal parts and as coatings and paint on metal parts. Compounded with other minerals, resins, and pigments to make interior paint, coatings, door panels, upholstery, dash boards, and composite body panels. Plastic parts, rubber parts such as seats, cushions, dash board, carpet fibres, vacuum, fuel, hydraulic, and air hoses, tires, body panels; and indicator lenses. Interior trim, dash board, steering wheel, tires, sound proofing, weather stripping, and other plastics and rubber parts. Intake manifold, transmission housing and other cast aluminium parts, plastic parts. As a flux in recycling aluminium and in preventing oxidation during casting of aluminum parts, as feed stocks for chlorine manufactured to produce resins to make paints, interior door panels, trim parts, dash boards, and composite body panels. Glass, electronic parts, paints, plastics, composites, engine, manifolds, rubber parts, light bulbs, and more. Used in moulds for cast parts. Used to make sodium silicate "water glass" for adhesives and sealants. Spark plugs, high temperature ceramic paints, plastics, composites, rubber parts, tires, light bulb bases, and more. Combined with clays, feldspar, silica, and fluorspar to make ceramic parts. Compounded with natural and synthetic rubber to make tires, vacuum, and fuel hoses. Combined with days, feldspar, silica, and fluorspar to make spark plugs and other ceramic components.

The nanotubes can induce an increase in conductivity to provide this protection. Also to be used as applications in fibre-reinforced composites, elastic-plastic fibre-reinforced composite materials, fibre-reinforced composite materials for strength which can prevent failure seen in other matrix composites since the onset of plastic yielding starts very early in the loading process as compared to the composite's ultimate strength. Elastic-plastic behaviour of nanotube-plastic composites consisting of aligned and non-aligned, continuous elastic filaments can be described in terms of the constituent properties, their volume fractions, and mutual constraints between phases indicated by the geometry of the microstructure.

The nanotube composite prevents degradation of plastics in light, heat and air, and reinforces the plastic for strength and durability.

The nanotube composite can be used in part for space suit manufacture and fabrication, EMF shielding for the suit. It may also be used to form a radiowave "shield" for applications such as stealth plane, military vehicles and vessels, rockets and space vehicles of all types. The composite can be used to provide a protective coating in part or full for vehicles including space vehicles, aeroplanes, ships, tanks, etc.

The nanotube extracting polymer has a natural fluorescence which is greatly enhanced by combination with nanotubes. This has widespread applications in display technology.

The invention is not limited to the embodiments hereinbefore described which maybe varied in both construction and detail within the scope of the appended claims.

We claim:

1. A process for purifying nanotube soot comprising the steps of:

adding nanotube soot to a solvent to form a solution, the solvent having dissolved in it a nanotube extracting material, said nanotube extracting material having a coiling structure;

mixing the solution to form a nanotube composite suspension and separate solid material, the nanotube composite suspension comprising nanotube extracting material selectively coiled about nanotubes;

allowing the separate solid material to settle; and removing the nanotube composite suspension.

2. A process as claimed in claim 1 wherein the nanotube extracting material is an organic material having a coiling structure.

3. A process as claimed in claim 2 wherein the nanotube extracting material is one or more polymer, oligomer or monomer or a combination thereof.

4. A process as claimed in claim 1 wherein the nanotube extracting material is poly(m-phenylene-co-2,5-dioctoxy-p-phenylenevinylene).

5. A process as claimed in claim 1 wherein the solvent is an organic solvent.

6. A process as claimed in claim 5 wherein the organic solvent is an arene aromatic hydrocarbon.

7. A process as claimed in claim 1 wherein the solution is mixed by sonication.

8. A process as claimed in claim 1 wherein the solution is mixed in a low power ultrasonic bath.

9. A process as claimed in claim 8 wherein the solution is mixed in the bath for at least 20 minutes.

10. A composition which includes nanotubes and an organic material having a coiling structure.

11. A composition as claimed in claim 10 wherein the organic material is a polymer, oligomer, monomer or a combination of any of the foregoing.

12. A composition as claimed in claim 11 wherein the organic material is a polymer.

13. A composition as claimed in claim 12 wherein the polymer is poly(m-phenylene-co-2,5-dioctoxy-p-phenylenevinylene).

14. A process as claimed in claim 1 wherein the nanotube extracting material is a polymer, the separate solid material comprises solid graphitic particles, and the process comprises removing the nanotube extracting polymer after the solid graphitic particles have been allowed to settle.

15. A nanotube composite suspension comprising nanotube extracting material selectively coiled about nanotubes, and wherein the nanotube extracting material is in a solvent for both nanotube soot and the nanotube extracting material.

* * * * *

UNITED STATES PATENT AND TRADEMARK OFFICE
CERTIFICATE OF CORRECTION

PATENT NO. : 6,576,341 B1
DATED : June 10, 2003
INVENTOR(S) : Andrew Davey et al.

It is certified that error appears in the above-identified patent and that said Letters Patent is hereby corrected as shown below:

<u>Title page,</u>
Item [73], Assignees should be deleted.

Signed and Sealed this

Twenty-fourth Day of February, 2004

JON W. DUDAS
*Acting Director of the United States Patent and Trademark Office*